(12) United States Patent
Weissman et al.

(10) Patent No.: US 7,842,634 B2
(45) Date of Patent: Nov. 30, 2010

(54) BLENDED CATALYST WITH IMPROVED PERFORMANCE

(75) Inventors: Jeffrey G. Weissman, W. Henrietta, NY (US); Ming-Cheng Wu, Troy, MI (US)

(73) Assignee: Umicore AG & Co. KG, Hanau (DE)

( * ) Notice: Subject to any disclaimer, the term of this patent is extended or adjusted under 35 U.S.C. 154(b) by 313 days.

(21) Appl. No.: 11/518,776

(22) Filed: Sep. 11, 2006

(65) Prior Publication Data

US 2008/0076661 A1 Mar. 27, 2008

(51) Int. Cl.
| | |
|---|---|
| *B01J 37/00* | (2006.01) |
| *B01J 31/00* | (2006.01) |
| *B01J 23/40* | (2006.01) |
| *B01J 23/42* | (2006.01) |
| *B01J 23/56* | (2006.01) |
| *B01J 23/44* | (2006.01) |
| *B01J 23/00* | (2006.01) |
| *B01J 23/70* | (2006.01) |
| *B01J 23/74* | (2006.01) |
| *C08F 4/02* | (2006.01) |
| *C08F 4/60* | (2006.01) |
| *C07C 27/00* | (2006.01) |
| *C07C 27/06* | (2006.01) |
| *C01B 3/26* | (2006.01) |

(52) U.S. Cl. .................. 502/104; 502/326; 502/332; 502/333; 502/334; 502/335; 502/336; 502/337; 502/338; 502/339; 502/349; 518/715; 423/651; 423/653; 423/654

(58) Field of Classification Search .................. 502/104, 502/326, 332–339, 349; 518/715; 423/651, 423/653, 654
See application file for complete search history.

(56) References Cited

U.S. PATENT DOCUMENTS

| | | | |
|---|---|---|---|
| 5,160,456 A | | 11/1992 | Lahn et al. |
| 5,395,813 A | | 3/1995 | Clavenna et al. |
| 5,618,772 A | | 4/1997 | Suda et al. |
| 5,981,427 A | * | 11/1999 | Sung et al. .................. 502/325 |
| 5,989,507 A | * | 11/1999 | Sung et al. ............... 423/213.5 |

(Continued)

OTHER PUBLICATIONS

Arnby, Karl, et al.; "Investigation of Pt/yAl2O3 catalysts with locally high Pt concentrations for oxidation of CO at low temperatures"; Journal of Catalysis 221 (2004) 252-261.

(Continued)

*Primary Examiner*—Patricia L Hailey
(74) *Attorney, Agent, or Firm*—Smith, Gambrell & Russell, LLP

(57) ABSTRACT

A useful partial oxidation catalyst element includes a catalyst component, a support component, and a substrate. The catalyst component is formed by combining a catalytically active metal with a first support material to form a mixture and calcining the mixture. The support component is formed by calcining a second support material, not containing the active metal. The first and second support materials include particles having an average particle diameter of less than 20 microns. A catalyst material is formed by combining the catalyst component and the support component, wherein the catalyst material contains less than 20% of the catalyst component by weight. The catalyst material is applied to a substrate configured for gas flow therethrough, thereby formulating the partial oxidation catalyst element. The partial oxidation catalyst element is especially useful for fuel reforming and fuel cell applications.

20 Claims, 2 Drawing Sheets

U.S. PATENT DOCUMENTS

| | | | |
|---|---|---|---|
| 6,080,699 A | 6/2000 | Pohl | |
| 7,199,072 B2* | 4/2007 | Crowther et al. | 502/113 |
| 2005/0096215 A1* | 5/2005 | Espinoza et al. | 502/302 |
| 2006/0045843 A1* | 3/2006 | Chen et al. | 423/651 |

OTHER PUBLICATIONS

Berger, R.J. et al.; "Catlyst performance testing: bed dilution revisited"; Chemical Engineering Science 57 (2002) 4921-4932.

Berger, R.J., et al.; "Catalyst performance testing: the influence of catalyst bed dilution on the conversion observed"; Chemical Engineering Journal 90 (2002) 173-183.

Arnby, Karl, et al.; "The effect of platinum distribution in monolithic catalysts on the oxidation of CO and hydrocarbons"; Journal of Catalysis 233 (2005) 176-185.

* cited by examiner

# BLENDED CATALYST WITH IMPROVED PERFORMANCE

STATEMENT REGARDING FEDERALLY-SPONSORED RESEARCH OR DEVELOPMENT

This invention was made with Government support under contract no. DE-FC26-02NT41246 awarded by DOE. The Government has certain rights in this invention.

TECHNICAL FIELD

The present invention relates to a method for forming a catalyst element, and in particular a partial oxidation catalyst element, which includes a catalyst component, a support component, and a substrate. It also relates to a method for fuel reforming including contacting the partial oxidation catalyst element with a fuel comprising a mixture of a hydrocarbon and an oxygen carrier, and producing a reformate product including hydrogen.

BACKGROUND OF THE INVENTION

Fuel cells are electrochemical devices that convert chemical potential energy into usable electricity and heat without combustion as an intermediate step. Fuel cells are similar to batteries in that both produce a DC current by using an electrochemical process. A fuel cell has two electrodes, an anode and a cathode, that are separated by an electrolyte. Like batteries, fuel cells are combined into groups, called stacks, to obtain a usable voltage and power output. Unlike batteries, however, fuel cells do not release energy stored in the cell, running down when stored energy is gone. Instead, they convert energy from a hydrogen-rich fuel directly into electricity and operate as long as they are supplied with the fuel and oxidant. Fuel cell power systems emit almost none of the carbon monoxide or nitrogen compounds released by conventional combustion of gasoline or diesel fuel, and can utilize a wide variety of fuels: natural gas, coal-derived gas, landfill gas, biogas, alcohols, gasoline, or diesel fuel oil. Accordingly, there is a desire to employ fuel cells to power motor vehicles as a way of reducing noxious emissions.

Methods for generating hydrogen-rich fuel for a fuel cell from petroleum-based hydrocarbons include steam reforming and partial oxidation. Between these two methods, steam reforming is disadvantageous because it requires a sizeable apparatus that requires a heat source to maintain its operation, whereas partial oxidation can be achieved in a catalytic process that utilizes a smaller reactor size than steam reforming. In addition, a catalytic partial oxidation apparatus on an automotive vehicle typically attains its operation more quickly after the engine is started than does a vehicle-based steam reforming apparatus. However, catalytic partial oxidation reactions typically occur at about 900° C. to about 1300° C., at which temperatures the catalytic activity often degrades.

The Solid Oxide Fuel Cell (SOFC) is an example of a technology that can utilize a partial oxidation catalyst. SOFC is considered to be the most desirable fuel cell for generating electricity from hydrocarbon fuels. This is because it is simple, highly efficient, tolerant to some impurities, and can internally reform low concentrations, less than 1%, of hydrocarbons. One of the big advantages of the SOFC over some competing technologies is that the electrolyte is a solid. This means that no pumps are required to circulate hot electrolyte. Another big advantage of the SOFC is that both hydrogen and carbon monoxide are used in the cell. This means that the SOFC can readily and safely use many common hydrocarbons fuels such as natural gas, diesel, gasoline, alcohol and coal gas.

SOFC does not require an expensive liquid cooling system. In fact insulation may be used to maintain the cell temperature on small systems.

In order for the SOFC to be efficient, an effective partial oxidation catalyst element is required to convert the hydrocarbon fuels to hydrogen, which is capable of operating for long durations and undergoing a large number of thermal cycles at high temperatures. Various methods have been described for the preparation of catalysts. However, many of these methods involve costly use of precious metals.

Suda et al., U.S. Pat. No. 5,618,772 describe a method for producing a catalyst having high catalytic activity. Ultrafine alumina particles are mixed with a catalytic component and a substance for inhibiting the sintering of fine alumina particles, such as silica particles, to form a slurry mixture. This slurry mixture is dried and then the mixture is calcined to obtain a porous catalyst. Particles (50 wt. % or more) have a size of 100 nm (0.1 micron or less).

Clavenna et al., U.S. Pat. No. 5,395,813, describe a precalcined low silica content zirconia, especially one stabilized with yttria, as useful as a catalyst support or as a heat transfer solids component for conducting chemical reactions at high temperature. Desirably average particle diameter of both zirconia particles, and any catalyst component particles used in conjunction with the zirconia, ranges from about 30 microns to about 150 microns. However, such large particle sizes can lead to extremely bad adhesion when the catalyst material is applied to the substrate by washcoat methods.

Lahn et al, U.S. Pat. No. 5,160,456, describe a process for producing synthesis gas including hydrogen and carbon monoxide in a fluid-bed or spouted-bed process by reacting methane or a lower alkane with steam and oxygen in the presence of essentially non-catalytic, heat carrying solids with periodic addition of a steam-reforming catalyst. The heat carrying materials, such as alumina, have a mean particle diameter ranging from about 20 to 150 microns, preferably 30-150 microns, more preferably 30-120 microns. The catalyst may have a similar particle size distribution as that found in the heat carrying material or it may have a somewhat larger particle size, e.g., from 70-250 microns or larger. However, as stated previously, such large particle sizes can lead to extremely bad adhesion when the catalyst material is applied to the substrate by washcoat methods. The process of Lahn can also produce product with relatively high levels of methane. This is undesirable because, for use in combination with solid oxide fuel cell technology, it is desirable to have a level of methane no higher than 1%.

Pohl, U.S. Pat. No. 6,080,699, describes heterogeneous massive catalyst which includes at least one catalytically active component in the form of solid particles and at least one catalytically inert component in the form of solid particles wherein the components are dispersed in one another. The inert component has a mean particle diameter greater than the mean particle diameter of the catalytically active component, and the particles of the catalytically active material are grown on the particles of the catalytically inert material. However, the methods of Pohl are directed towards hydrogenation of natural fats and oils and are not typically useful for the preparation of a catalyst for fuel reforming.

K. Arnby et al. in *J. Catal.* 221, 252 (2004) and also in *J. Catal.,* 223, 176 (2005) disclose a catalyst formulation useful for carbon monoxide oxidation involving a platinum catalyst distributed in locally high concentrations on a gamma alumina support. However, the reaction reported is not typical of
} fuel reforming reactions, as it yields an undesired product, carbon dioxide. The catalyst is reported to suffer significant thermal degradation over a time scale of 20 minutes and the advantages of this formulation are not found for oxidation of hydrocarbons, only for the oxidation of carbon monoxide.

R. J. Berger et al., *Chem. Eng. Sci.*, 57, 4921 (2002) and *Chem. Eng. Sci. J.*, 90, 173 (2002), describe the catalytic performance of a reaction bed dilution wherein catalyst particles are diluted with inert particles. It is reported that, in certain cases, such bed dilution may have an adverse effect on reactant conversion.

However, none of the described methods are suitable for preparing a reformate product that can be used in conjunction with a fuel cell in an economical manner. The methods reported above do not describe how to prepare a catalyst suitable for fuel reforming that will have enhanced thermal stability and allow one to reduce the level of the catalytically active metal while maintaining catalytic performance and provide means to effectively washcoat a catalyst carrier without subsequent loss of adhesion.

Fuel reforming is the process of reacting hydrocarbons, including for example, methane, natural gas, gasoline, kerosene, diesel fuel, and gas-oil mixtures, with an oxygen carrier, such as air, purified air, oxygen, steam, water, or carbon dioxide, over a catalyst to produce a reformate product consisting of primarily $H_2$ and CO, with minimal amounts of residual hydrocarbons. To be used effectively with a solid oxide fuel cell, the reforming process must be efficient and produce material having a relatively low content of hydrocarbons; for instance, no more than 1 mole % methane and no more than 0.2 mole % other hydrocarbons is desirable in some solid oxide fuel cell operations. Some current catalysts are capable of processing the reaction of hydrocarbons with an oxygen carrier to sufficient conversion to meet reformate product qualities. However, these current catalysts are prone to deactivation, the primary mechanism for this is thermal degradation brought on by the high temperatures that these catalysts typically operate at, and in addition some applications call for a large (greater than 100,000) number of thermal cycles, including exposing the catalyst to periods of lean operation, which further contributes to thermal degradation.

Current means to overcome thermal degradation and improve durability include increasing the catalyst's metal content, employing a large volume of catalyst, or using complex catalyst support materials. Each of these approaches adds significant cost to the application. Thus, there is a need for an improved method for fuel reforming by catalytic partial oxidation and a need for a reformate catalyst element having improved durability and lower cost.

SUMMARY OF THE INVENTION

The present invention is directed to a method of formulating a partial oxidation catalyst element. A catalyst component is formed by combining a catalytically active metal with a first support material to form a mixture and calcining said mixture to form a catalytic component. A support component is formed by calcining a second support material, not containing the active metal. The first and second support materials include particles having an average particle diameter of less than 20 microns, and desirably an average particle diameter between about 1-10 microns. A catalyst material is formed by combining the catalytic component and the support component, wherein the catalyst component is less than 20% of the catalyst material by weight. The catalyst material is applied to a substrate configured for gas flow therethrough, thereby formulating a partial oxidation catalyst element.

In another aspect of the current invention, a method for fuel reforming is provided that includes contacting a partial oxidation catalyst element, prepared according to the current inventive method described above, with a fuel comprising a mixture of a hydrocarbon and an oxygen carrier, at a temperature between about 900 and about 1300° C. and thereby producing a reformate product comprising hydrogen, about 1 vol. % or less of methane, and about 0.2 vol. % or less of hydrocarbons other than methane.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
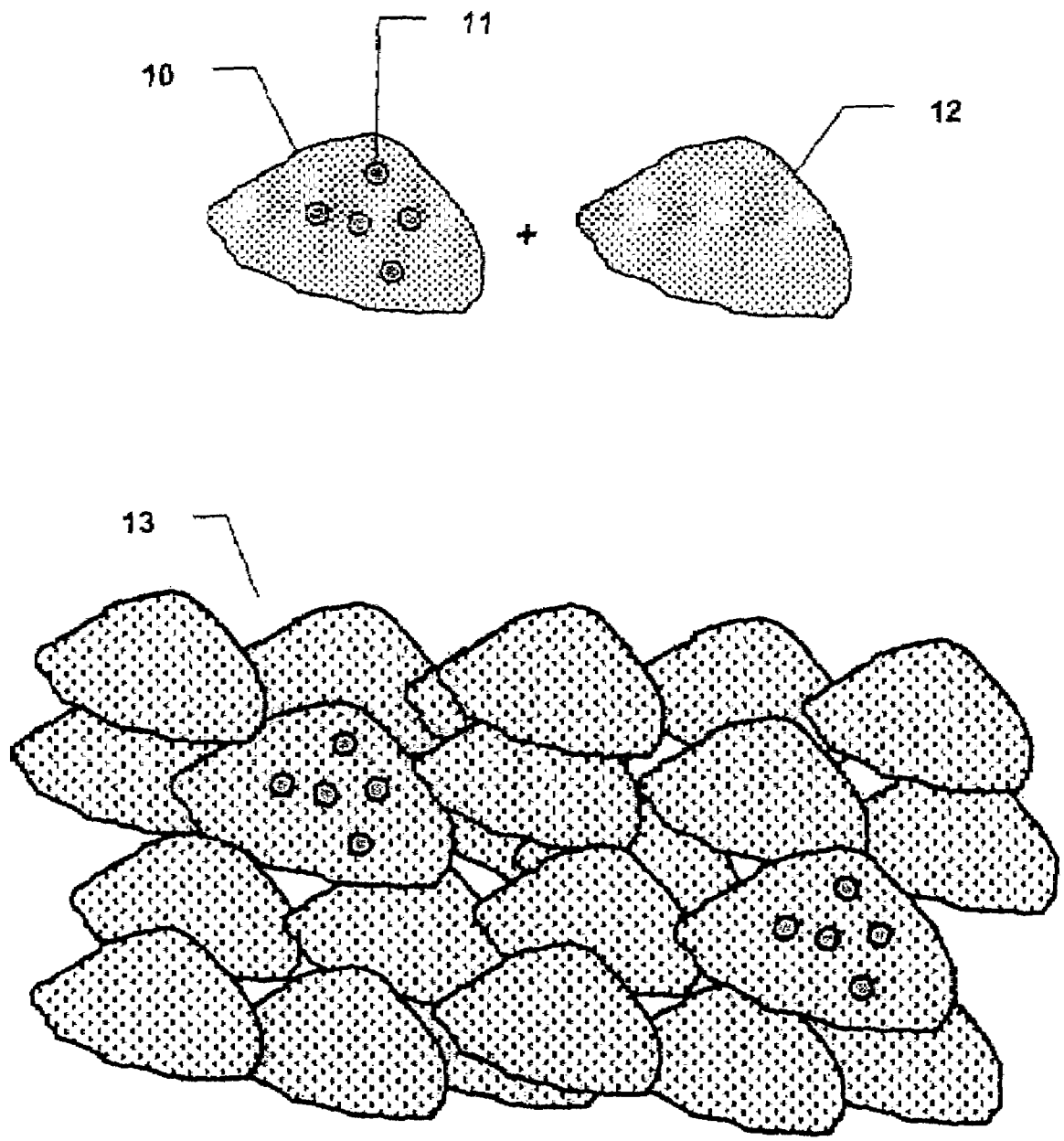
FIG. 1 is a schematic representation of one embodiment including a catalyst component, a support component, and a catalyst material.

The method of formulating a partial oxidation catalyst element is summarized above. A partial oxidation catalyst is one that catalyses the reaction of fuel, including a hydrocarbon and an oxygen carrier, to produce hydrogen. An oxygen carrier is a material including the element oxygen that is capable of reacting with a hydrocarbon, in the presence of the catalyst. For example, oxygen carriers include oxygen ($O_2$), water, and carbon dioxide. A partial oxidation catalyst is often used at high temperatures, for example in the range of 900 to 1300° C. To be especially useful for fuel cell applications, the fuel should react, in the presence of the partial oxidation catalyst, to afford a product that desirably has a content of about 20 vol. % or greater of hydrogen, about 1 vol. % or less of methane, and about 0.2 vol. % or less of hydrocarbons other than methane.

The method of formulating a partial oxidation catalyst element includes combining a catalytically active metal with a first support material to form a mixture, and calcining said mixture to form a catalytic component. A second support material, not containing the active metal, is calcined to form a support component. The first and second support materials have the same or different compositions, and include particles that have an average diameter of less than 20 microns. Suitably, the first and second support materials consist of particles having an average diameter of between about 0.1 and 15 microns, desirably between about 0.5 and 15 microns, and preferably between about 1 and 10 microns or even between about 2 and 10 microns. If the particles are too large, for example 20 microns or greater, it can be difficult to attach the particles to the substrate in an economical manner.

The catalytically active metal is a metal that will catalyze the conversion of a mixture of hydrocarbon and oxygen carrier to a mixture including hydrogen. The catalytically active metal is desirably a Group VIIIA metal, including Ni, Rh, Pt, Pd, Ir, or Au. Rh is an especially desirable metal. Combinations of these metals may also be useful and the term catalytically active metal, as used herein, refers to either a single metal or a combination of metals.

The first and second support material may be the same material or different materials. In one suitable embodiment they are the same materials. A suitable support material should be thermally stable, so that it will not adversely affect catalytic performance when subjected to the expected temperatures of use. Examples of support material include various forms of alumina ($Al_2O_3$), such as alpha-alumina and gamma-alumina. Various forms of zirconium oxide ($ZrO_2$) are also useful. An oxide modified by a stabilizing species, for example, a rare earth-modified zirconium oxide or alumina, such as lanthanum- or yttrium-modified gamma-alumina, or alkali- or alkaline earth-stabilized alumina such as barium-modified alumina, or physically stabilized gamma-alumina may also be employed. For example, it may be desirable to stabilize gamma-alumina by forming lanthanum-stabilized alumina. Especially desirable support material include gamma, theta, delta, or alpha $Al_2O_3$, monoclinic $ZrO_2$, and compounds of magnesium-lanthanum-aluminum oxides.

Additives (e.g., stabilizers and/or the like) may be co-impregnated into a support material. For example, one or more alkali, alkaline earth and/or rare earth metal oxides may be included in the support material. For instance, it may be useful to include barium sulfate in a support material comprising alpha-alumina.

A catalytic mixture, obtained by combining a catalytically active metal with a first support material, can be formed in various ways. In one embodiment, an aqueous solution of the catalytic metal, for example, a water-soluble salt of the metal, may be impregnated into particles of a support material. The wet, impregnated support material may then be dried. In an alternative embodiment, a slurry of the catalytic metal may be coated on the surface of the substrate. Concentrations of the active metal in the catalytic component can desirably range from about 0.5 to 30 wt. %, suitably from about 1.0 to 20 wt. % and commonly from about 2.5 to 15 wt. %.

The catalytic mixture is calcined at a temperature desirably in the range of about 500-2000° C., suitably in the range of about 750 to 1800° C., and commonly in the range of about 1000 to 1500° C., to form a catalytic component.

A second support material, not including a catalytically active metal, is calcined at an independently chosen temperature, desirably in the range of about 500-2000° C., suitably in the range of about 750 to 1800° C., and commonly in the range of about 1000 to 1500° C. This forms a support component.

The catalytic component and the support component are combined to from a catalyst material. Desirably, the two components are mixed well enough that there is a nearly homogeneous distribution of the catalytic component throughout the support component. FIG. 1 shows a schematic representation of one embodiment including a catalytic component (10), a support component (12), and a catalyst material (13) obtained by combining catalytic and support components. The dark circles (11) on the catalytic component represent areas in which the active metal is localized.

The catalyst material includes less than 20% of the catalytic component by weight. Desirably the catalyst material includes less than about 15%, or even less than about 10% of the catalyst component. Suitably, the catalyst material includes more than about 0.5%, desirably more than about 1%, and preferably about 2.5% or more of the catalyst component by weight.

The catalyst material is applied to a substrate, configured so that gas can flow through it, to form a catalyst element. The catalyst material can be applied via washcoating, thermal spray, or other physical deposition techniques. When a catalytic material is deposited onto a flow-through substrate to form a catalyst element, the amount of the active catalytic metal is sometimes characterized in terms of density within the element, for example, in grams per cubic meter ($g/m^3$) or grams per cubic foot ($g/ft^3$) of the catalyst element. A suitable catalyst element includes about 0.5 to 500 g of active metal per $ft^3$ of substrate (about 20 to 20,000 g per $m^3$ of substrate); optionally about 1 to 100 g of active metal per $ft^3$ of substrate (about 35 to 3500 g per $m^3$ of substrate); and often about 5 to 30 g of active metal per $ft^3$ of substrate (about 200 to 1000 g per $m^3$ of substrate); and desirably about 10 to 15 g of active metal per $ft^3$ of substrate (about 350 to 500 g per $m^3$ of substrate). In one embodiment, the catalyst element includes about 1500 g or less of active metal per $m^3$ of substrate, suitably about 1000 g or less of active metal per $m^3$ of substrate, and desirably about 500 g or less of active metal per $m^3$ of substrate. The loading of a catalyst material on a substrate may be adjusted to achieve a desired density of the catalytic active metal in the catalyst element.

Any carrier substrate that can receive catalytic material thereon, that is configured to permit gas flow therethrough, and that is capable of withstanding the conditions under which catalytic partial oxidation process occurs, may be employed. Suitable substrates include, for example, monolith honeycombs, foams, metal foils, plates, or wires. The substrate is often made of ceramic, metallic, or cermet materials. One possible configuration of such a substrate is a monolithic "honeycomb" having a plurality of gas flow passages extending therethrough from an inlet to an outlet face of the carrier. The passages, which may be optionally be straight from their fluid inlet to their fluid outlet, are defined by walls on which catalytic materials may be deposited (optionally as "washcoats") so that the gases flowing through the passages contact the catalytic material. The gas flow passages may be of any suitable cross-sectional shape and size, and there may be tens or hundreds of gas inlet openings ("cells") per square inch of cross section of the substrate. Alternatively, the substrate may be in the form of a foamed monolithic structure, which may be characterized in terms of the number of pores per inch of the substrate ("ppi"), or in the form of a bed of pellets, beads or the like. The substrate may be made of any suitable material capable of withstanding the operating conditions of the catalyst element, e.g., a refractory material, for example, a ceramic material. In a particular embodiment, the substrate may comprise zirconia-toughened alumina (ZTA). Blends of zirconia with alumina ($ZrO_2$—$Al_2O_3$) can result in a performance combination that has better wear resistance than alumina alone, but with improved hardness, strength and thermal properties compared to these other materials, especially at elevated temperature. Pure alumina, or combinations of alumina and/or zirconia with mullite may also be suitable. Flow-through substrates made from metals or metal alloys may also be used.

At reaction temperatures required for fuel reforming, in general from about 600 to 1300° C., the rate of mass transport due to diffusion and/or convection is similar to or less than the rate of reaction; especially as the reaction approaches equilibrium conditions. In general, the reforming process operates close to equilibrium. Since transport of reactants to and/or products away from catalytically active sites determines conversion under these conditions, the number of catalytically active sites can be reduced. However, if too many active sites are removed, then chemical reaction will become rate limiting. To prevent this from happening, a higher than normal amount of active metal is loaded onto the first support material, and through dilution with the second support material the advantage of overall reduction in active metal usage is realized.

The process of the present invention is illustrated by the examples presented below. The support particles described below have an average particle diameter of 4-5 microns. When materials are reported as calcined, they are heated to 1200° C. for 6 hours.

EXAMPLE 1

The Effects of Thermal Aging on Catalyst Elements

A catalyst element, C-1, was prepared by a comparative process that included adding rhodium nitrate to particles of alpha alumina (designated ATG), having a surface area of 7 m$^2$/g to form a catalyst with 2% Rh by weight. These were combined by forming a slurry of the alpha alumina and rhodium nitrate with water, and so forming a washcoat. The catalyst material was washcoated onto an 8 pores-per-cm (20 pores-per-inch (ppi)) zirconia-toughened alumina (ZTA) reticulated foam monolith substrate to yield a catalyst element, C-1, containing Rh at 1060 g/m$^3$ (30 g/ft$^3$) of substrate.

A second catalyst element, I-1, was prepared by the inventive process. Catalyst I-1 was prepared using the same materials as C-1, however two components were prepared initially. A catalyst component was prepared by adding rhodium nitrate to particles of ATG, having a surface area of 7 m$^2$/g to afford particles with 10 wt. % Rh. The alumina and rhodium components were combined with water, forming a slurry. The water was removed in a rotating steam evaporation apparatus. A support component consisted of only ATG particles. The components were separately calcined at 1200° C. for 6 hours. Catalyst material was formed by mixing the components at a weight ratio of 1:10 and forming a washcoating slurry of the first catalyst support component, the second support component, and water. The catalyst material was washcoated onto a 20 pores-per-inch (ppi) zirconia-toughened alumina (ZTA) reticulated foam monolith substrate to form catalyst element I-1. Both catalyst element I-1 and catalyst element C-1 contain Rh at 1060 g/m$^3$ (30 g/ft$^3$) of substrate. These elements are referred to as 'fresh' catalysts.

Additional samples of elements C-1 and I-1 were prepared as described above and then aged at 1200° C. for 6 hours, to afford sample elements C-2 and I-2 respectively. This aging condition would be representative of a severe condition experienced in the operation of a reformer catalyst. These elements are referred to as 'aged' catalysts.

Table 1a summarizes the composition of the four samples (C-1, C-2, I-1, and I-2). The samples were subjected to testing using gasoline vapor having a composition complying with California Air Resources Board (CARB) Phase II requirements, with air added to yield an oxygen/carbon ratio of about 1.03-1.04, at a temperature of 950° C. and a total space velocity of about 48,000/hr. Compositions of the reformate produced, averaged over the first 100 to 300 minutes of testing, are shown in Table 1b, wherein % H$_2$, % CO, % CH$_4$ and % RH are the volume percentage of hydrogen, carbon monoxide, methane, and residual hydrocarbons other than methane, respectively. For good performance, the reformate produced should have about 20% or greater H$_2$ and no more than 0.2% RH (residual hydrocarbons) in order to be utilized in a solid oxide fuel cell.

TABLE 1a

Composition of Example 1 catalyst elements.

| Catalyst Element | Example Type | Cat. Type[1] | Catalyst Component | Support Component | Blend Ratio | Loading g/m$^3$ |
|---|---|---|---|---|---|---|
| C-1 | Comparative | fresh | 2% Rh on ATG | None | — | 1060 |
| C-2 | Comparative | aged | 2% Rh on ATG | None | — | 1060 |
| I-1 | Inventive | fresh | 10% Rh on ATG | ATG | 1:10 | 1060 |
| I-2 | Inventive | aged | 10% Rh on ATG | ATG | 1:10 | 1060 |

[1]Aged refers to catalyst elements that were thermally aged. Fresh catalyst elements were not thermally aged.

TABLE 1b

Testing data for Example 1 catalyst elements.

| Catalyst Element | Example Type | Cat. Type | % CO | % CH$_4$ | % RH | % H$_2$ | Relative H$_2$ |
|---|---|---|---|---|---|---|---|
| C-1 | Comparative | fresh | 23.6 | 1.39 | 0.08 | 22.1 | 100 |
| C-2 | Comparative | aged | 22.6 | 2.25 | 0.20 | 19.3 | 87 |
| I-1 | Inventive | fresh | 23.5 | 1.08 | 0.12 | 21.5 | 97 |
| I-2 | Inventive | aged | 23.6 | 1.37 | 0.05 | 21.6 | 98 |

As can be seen from Table 1, the 'aged' comparative catalyst C-2 lost more than 10% of its activity for producing hydrogen relative to the 'fresh' comparative catalyst C-1. The level of RH, that is, the level of residual hydrocarbons other than methane, rose by 150% after aging. Since the thermal aging test is representative of the type of severe conditions experienced in the operation of a reformer catalyst, one would expect catalyst prepared by the comparative process to afford poor performance with a device, such as a solid oxide fuel cell, that utilizes reformate.

The fresh catalyst prepared by the inventive process, I-1, had slightly lower selectivity towards the production of H$_2$ relative to C-1, however, production was still well within an acceptable range. Importantly, the corresponding aged catalyst, I-2, exhibited no thermal degradation, relative to I-1 with respect to hydrogen production and produced a decrease in the level of hydrocarbons (RH) present. Thus a catalyst prepared by the inventive process is well suited for use in conjunction with a solid oxide fuel cell.

EXAMPLE 2

The Effect of Blend Ratios on Catalyst Elements

A series of catalysts elements with two different types of alumina support material were prepared. The first type of support material, designated ANC, was comprised of gamma alumina with a surface area of 210 m$^2$/g. The ANC material was calcined at 1200° C. for 6 hours, during which time the gamma alumina was converted to primarily theta alumina with a surface area of 44 m$^2$/g.

The second type of alumina support, designated ATS, was comprised of a mixture of primarily delta and theta alumina, with minor alpha alumina, and had a surface area of 64 m$^2$/g. This material was calcined at 1200° C. for 6 hours. No significant change in properties was detected due to this thermal treatment.

Catalyst element C-3 was prepared by a comparative process. C-3 was made by preparing 5 wt. % Rh on ANC, calcining this material to afford a catalyst component, and mixing 1:4 with the support material ANC, which had also been calcined. The mixture was washcoated onto a 20 pores-per-inch (ppi) ZTA reticulated foam monolith substrate to afford catalyst element C-3, which had a level of 777 g/m³ (22 g/ft³) Rh.

Catalyst element C-4 was made by a comparative process by preparing 5 wt. % Rh on ATS, calcining this material, and mixing 1:4 with calcined ATS. The mixture was washcoated onto a 20 pores-per-inch (ppi) ZTA reticulated foam monolith substrate to yield element C-4, with 2440 g/m³ (69 g/ft³) Rh on the substrate.

Catalysts elements C-5 and C-6 are replicates and were prepared by comparative process by taking 2 wt. % Rh on ATS, washcoating to yield 2120 g/m³ (60 g/ft³) on the substrate, and then calcining at 1200° C. for 6 hours.

Catalyst element I-3 was made by the inventive process by preparing 10 wt. % Rh on ANC, calcining this material, and mixing 1:9 with calcined ANC. The mixture was washcoated onto a 20 pores-per-inch (ppi) ZTA reticulated foam monolith substrate to yield 1310 g/m³ (37 g/ft³) Rh on the substrate.

Catalyst element I-4 was made by the inventive process by preparing 5 wt. % Rh on ATS, calcining this material, and mixing 1:9 with calcined ATS. The mixture was washcoated onto a 20 pores-per-inch (ppi) ZTA reticulated foam monolith substrate to yield 353 g/m³ (10 g/ft³) Rh on the substrate.

Catalyst element I-5 was made by the inventive process by preparing 5 wt. % Rh on ATS, calcining this material, and mixing 1:19 with calcined ATS. The mixture was washcoated onto a 20 pores-per-inch (ppi) ZTA reticulated foam monolith substrate to yield 424 g/m³ (12 g/ft³) Rh on the substrate.

Table 2a summarizes the composition of the catalysts elements produced. The elements were tested for US'07 certification diesel fuel partial oxidation, blended with air to yield an oxygen/carbon ratio of about 1.03-1.04, at a temperature of about 1000° C., and a total space velocity of about 60,000/hr. Compositions of the reformate produced, averaged over the first 50 to 300 minutes of testing, are listed in Table 2b. For good performance, the reformate produced should have at least 20% or greater $H_2$ and no more than 0.2% RH in order to be utilized in a solid oxide fuel cell.

TABLE 2a

Composition of Example 2 catalyst elements.

| Catalyst Element | Example Type | Catalyst Component | Support Component | Blend Ratio | Loading (g/m³) |
|---|---|---|---|---|---|
| C-3 | Comparative | 5% Rh on ANC | ANC | 1:4 | 777 |
| C-4 | Comparative | 5% Rh on ATS | ATS | 1:4 | 2440 |
| C-5 | Comparative | 2% Rh on ATS | None | — | 2120 |
| C-6 | Comparative | 2% Rh on ATS | None | — | 2120 |
| I-3 | Inventive | 10% Rh on ANC | ANC | 1:9 | 1310 |
| I-4 | Inventive | 5% Rh on ATS | ATS | 1:9 | 353 |
| I-5 | Inventive | 5% Rh on ATS | ATS | 1:19 | 424 |

TABLE 2b

Testing data for Example 2 catalyst elements.

| Catalyst Element | Example Type | % $H_2$ | % CO | % $CH_4$ | % RH |
|---|---|---|---|---|---|
| C-3 | Comparative | 18.5 | 22.2 | 1.27 | 0.03 |
| C-4 | Comparative | 18.7 | 22.4 | 1.39 | 0.03 |
| C-5 | Comparative | 20.4 | 22.6 | 0.53 | 0.07 |
| C-6 | Comparative | 20.2 | 22.7 | 0.43 | 0.04 |
| I-3 | Inventive | 19.5 | 21.9 | 0.63 | 0.04 |
| I-4 | Inventive | 20.1 | 21.7 | 0.50 | 0.13 |
| I-5 | Inventive | 20.1 | 21.7 | 0.55 | 0.15 |

Figure 2:
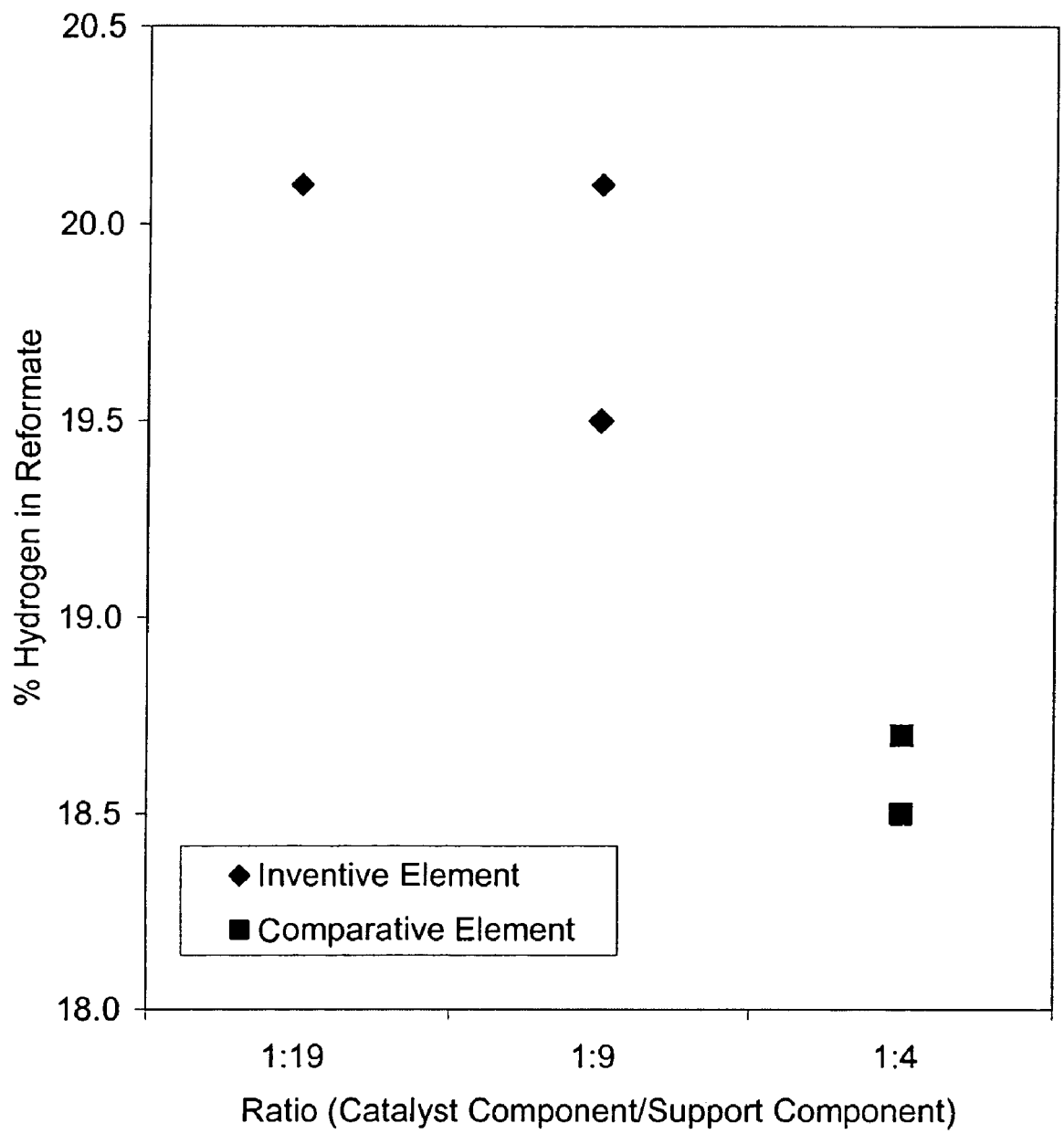
FIG. 2 is a plot of hydrogen production versus the ratio of the catalyst component to the support component present in the catalytic element as described in Example 2.

Catalysts I-4 and I-5, prepared according to the inventive process, have nearly the same performance, with respect to hydrogen production, as comparative catalysts, C-5 and C-6, while using less than 20% of the active metal, Rh. The catalyst I-3, also prepared by the inventive process, is slightly diminished in hydrogen production but affords very low levels of residual hydrocarbons (% RH). Catalyst C-3 and C-4, afford significantly lower hydrogen compared to I-3, and I-4, even though they have higher levels of Rh. FIG. 2 shows a plot of hydrogen production versus the blend ratio of the catalyst component to the support component. Surprisingly, the lower ratios of 1:19 (5% catalyst component) and 1:9 (10% catalyst component) afford much higher hydrogen production relative to the higher 1:4 ratio (20% catalyst component).

Embodiments of the current process may afford catalysts having improved thermal durability, requiring lower amounts of catalytically active metal, and having reduced cost, while maintaining adequate or superior performance for hydrocarbon fuel reformation.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for forming a partial oxidation catalyst element comprising the steps of:
    a) forming a calcined catalytic component by combining a catalytically active metal selected from the group consisting of Ni, Rh, Pt, Pd, Ir, Au, and combinations thereof with a first support material to form a mixture, wherein the first support material comprises particles having an average particle diameter of less than 20 microns, and calcining said mixture to form the calcined catalytic component;
    b) forming a calcined support component by calcining a second support material, not containing the catalytically active metal, wherein the second support material comprises particles having an average particle diameter of less than 20 microns;
    c) forming a catalyst material by mixing together said calcined catalytic component and said calcined support component, wherein the catalyst material contains less than 20% of the calcined catalytic component by weight; and
    d) applying said catalyst material to a substrate configured for gas flow therethrough, thereby forming the partial oxidation catalyst element.

2. The method according to claim 1 wherein the catalyst material contains about 10% or less of the calcined catalytic component by weight.

3. The method according to claim 1 wherein the catalyst material contains about 5% or less of the calcined catalytic component by weight.

4. The method according to claim 1 wherein the catalytically active metal comprises Ni, Rh, Pt, Pd, Ir, and Au.

5. The method according to claim 1 wherein the catalytically active metal comprises Rh.

6. The method according to claim 1 wherein the catalyst element comprises about 1000 g or less of the catalytically active metal per m$^3$ of substrate.

7. The method according to claim 1 wherein the catalyst element comprises about 500 g or less of the catalytically active metal per m$^3$ of substrate.

8. The method according to claim 1 wherein the first and second support materials are the same.

9. The method according to claim 1 wherein the first and second support materials are different.

10. The method according to claim 1 wherein the first and second support materials comprise particles having an average diameter of about 1-10 microns.

11. The method according to claim 1 wherein both the first and second support materials comprise Al, Zr, Ce, Y, La, or Mg.

12. The method according to claim 1 wherein both the first and second support materials comprise $Al_2O_3$ or $ZrO_2$.

13. The method according to claim 1 wherein at least one support material comprises gamma or alpha $Al_2O_3$.

14. The method according to claim 1 wherein at least one support material comprises monoclinic $ZrO_2$.

15. The method according to claim 1 wherein the substrate comprises a ceramic, metallic, or cermet material.

16. The method according to claim 1 wherein the substrate comprises a monolith honeycomb, a foam, a metal foil, a plate, or a plurality of wires.

17. The method according to claim 1 wherein the substrate comprises zirconium oxide and alumina.

18. The method according to claim 1 wherein the calcining temperature of step a), step b), or both is between about 1000 and about 1500° C.

19. A method for fuel reforming comprising the steps of:
a) contacting a partial oxidation catalyst, formed according to the method of claim 1, with a fuel comprising a mixture of a hydrocarbon and an oxygen carrier, at a temperature between about 900 and about 1300° C.; and
b) producing a reformate product comprising hydrogen, about 1 vol.% or less of methane, and about 0.2 vol.% or less of hydrocarbons other than methane.

20. The method according to claim 19 wherein the reformate product comprises about 20 vol.% or greater of hydrogen.

* * * * *